United States Patent [19]

DiAntonio

[11] Patent Number: 4,562,915
[45] Date of Patent: Jan. 7, 1986

[54] LUBRICATION TUBE INTERCONNECTIONS FOR IDLER ROLLS

[75] Inventor: Daniel J. DiAntonio, Nutley, N.J.

[73] Assignee: Litton Systems, Inc., Del.

[21] Appl. No.: 225,445

[22] Filed: Jan. 15, 1981

Related U.S. Application Data

[63] Continuation of Ser. No. 928,588, Jul. 27, 1978, abandoned, which is a continuation of Ser. No. 545,804, Jan. 31, 1975, abandoned, which is a continuation of Ser. No. 395,401, Sep. 10, 1973, abandoned.

[51] Int. Cl.$^4$ .............................................. B65G 45/02
[52] U.S. Cl. ..................................... 198/501; 285/238
[58] Field of Search .......................... 198/501; 193/37; 308/20, 187; 285/3, 4, 20, 238, 239, 331, 334.5, 343, DIG. 22

[56] References Cited

U.S. PATENT DOCUMENTS

| | | | |
|---|---|---|---|
| 2,787,480 | 4/1957 | Staller | 285/238 |
| 2,967,067 | 1/1961 | Singer | 285/238 |
| 3,489,471 | 1/1970 | Kelly | 308/187 |
| 3,817,562 | 6/1974 | Cook et al. | 285/238 |
| 3,892,306 | 7/1975 | Bertaud | 198/501 |

FOREIGN PATENT DOCUMENTS

1227292 10/1966 Fed. Rep. of Germany ...... 285/238

Primary Examiner—Jeffrey V. Nase
Attorney, Agent, or Firm—Morris I. Pollack

[57] ABSTRACT

A series of flexible, substantially cylindrical tubes communicates with the hollow central bores of shafts of adjacent idler rolls to form a conduit so that lubrication introduced through a fitting at one end of the idler roll assembly can be distributed in sequence to all of the rolls. Opposite ends of each tube are secured in position by insertion into an axial passageway in the end caps secured to the ends of the shafts. In the preferred embodiment, each passageway has a tapered entrance to facilitate the insertion of a tube, and a radially inwardly extending knife edge at the inner end remote from the entrance. The diameter of the passageway along its axial extent is slightly larger than the external diameter of the tube, while the diameter of the passageway at the knife edge is smaller than the external diameter of the tube to deform same and secure it in fixed position. In one alternative embodiment, the tube is notched at its ends to enhance its ability to "neck down"; in another alternative embodiment, axial slits are substituted for the notches. In yet another alternative embodiment, the tube has an annular bead and a neck of reduced diameter formed at each end. In still another alternative embodiment, the tube is of cylindrical configuration, and each end of the tube is slipped over an outwardly tapering hollow boss and seated in an annular groover in the face of the end cap. The diameter of the groove and of the large end of the boss is greater than the inner diameter of the tube so the tube is expanded to thus form a tight seal.

3 Claims, 11 Drawing Figures

U.S. Patent  Jan. 7, 1986  Sheet 1 of 2  4,562,915
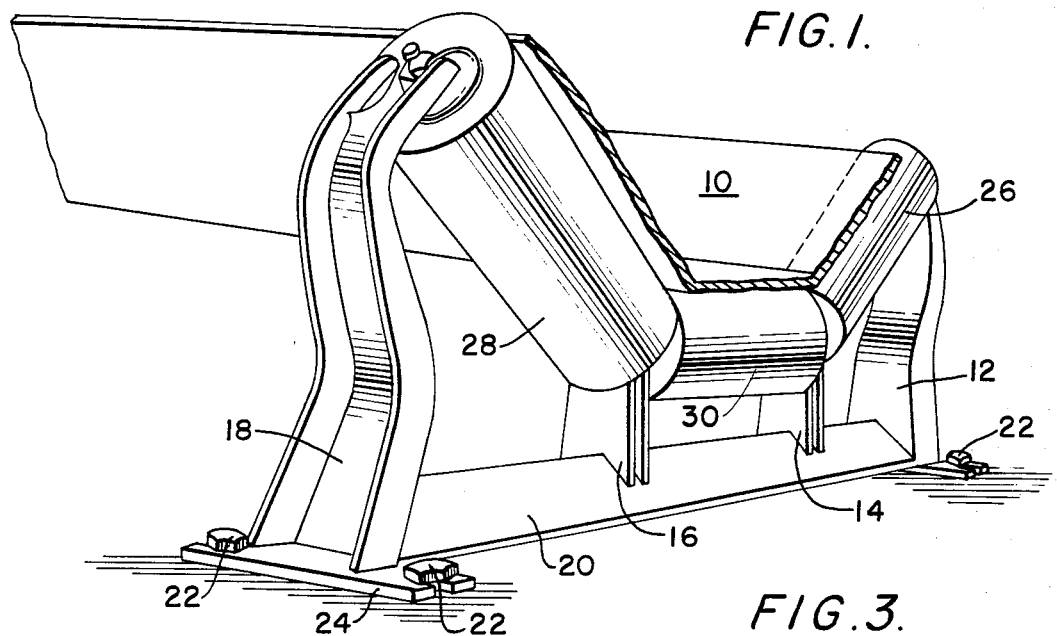
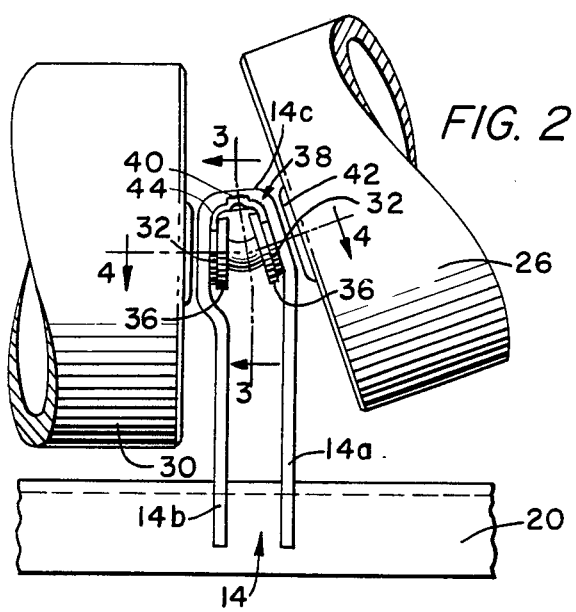
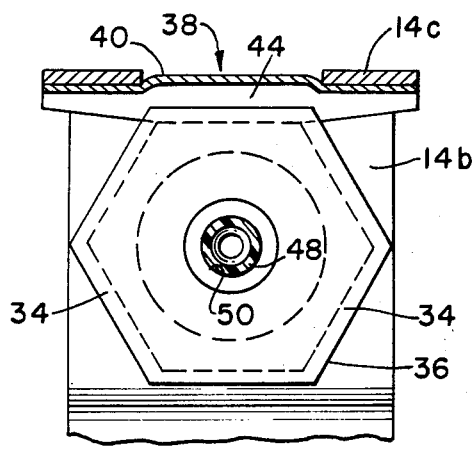
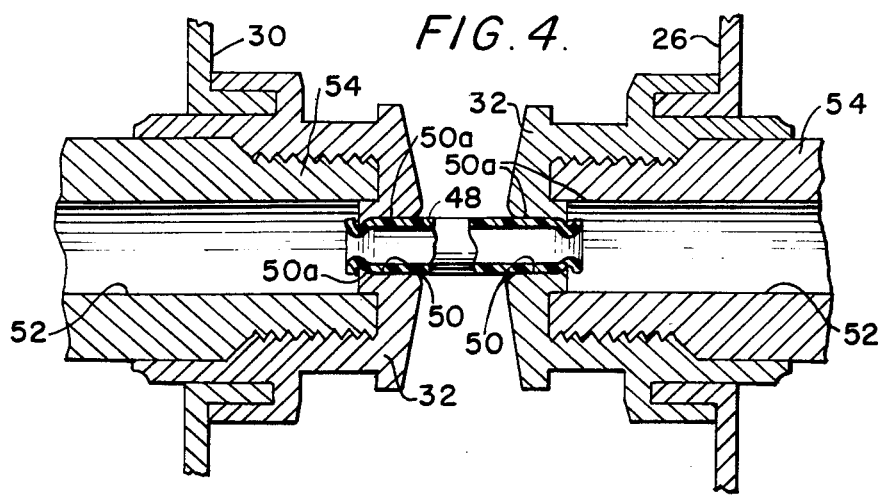
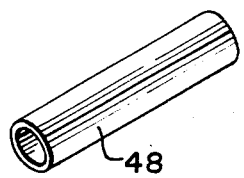

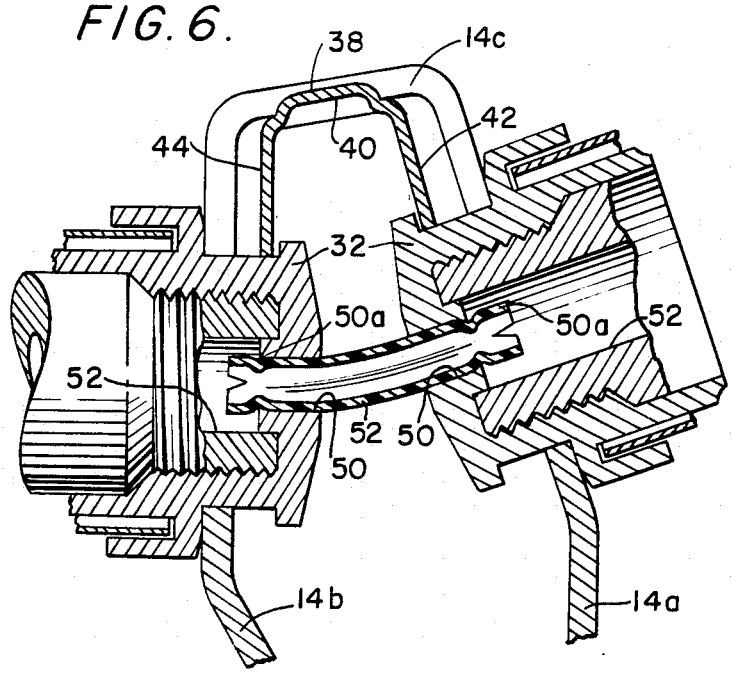
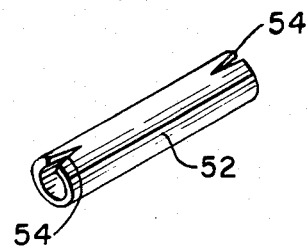
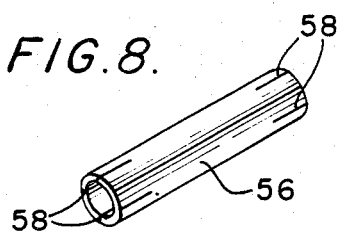
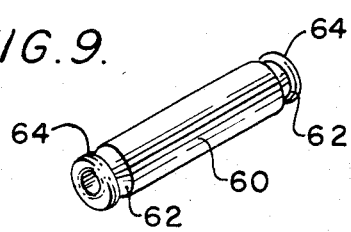
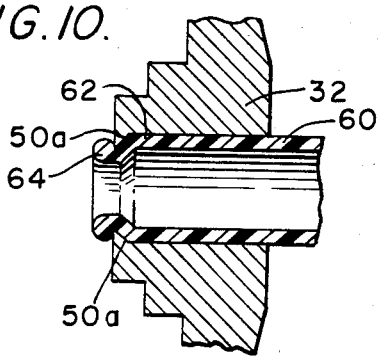
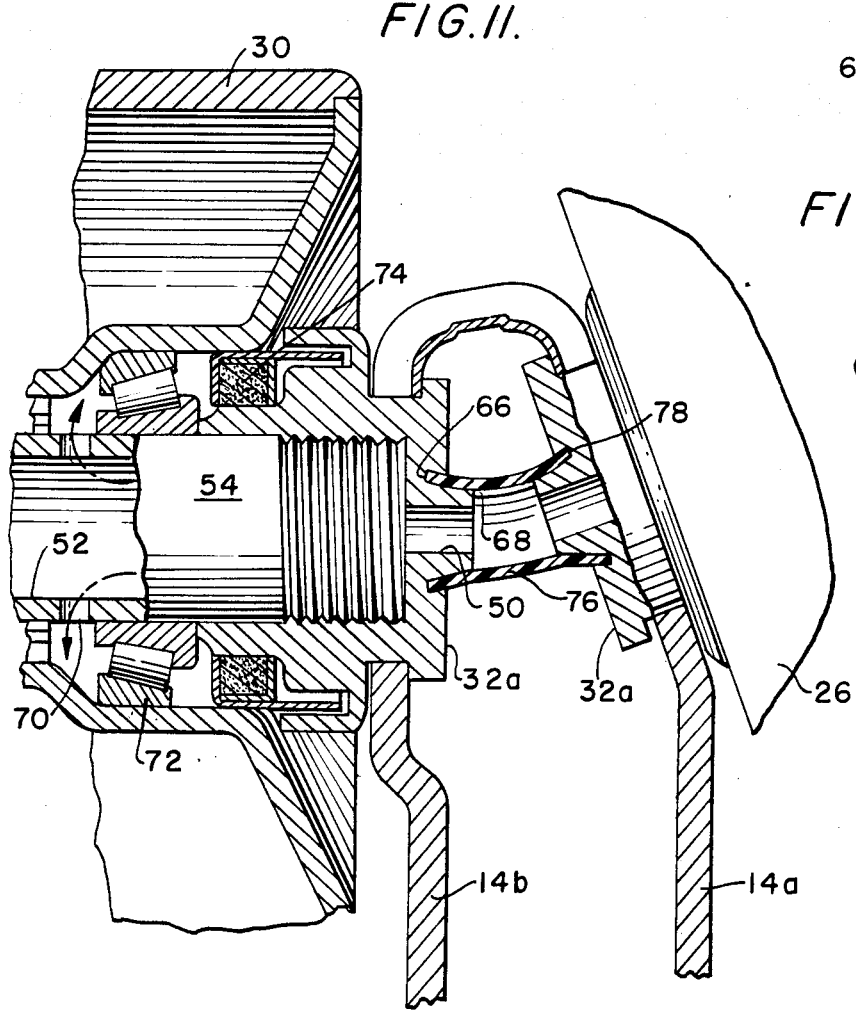

LUBRICATION TUBE INTERCONNECTIONS FOR IDLER ROLLS

This is a continuation of application Ser. No. 928,588, filed July 27, 1978 now abandoned; which in turn is a combination of application Ser. No. 545,804, filed Jan. 31, 1975 now abandoned; which in turn was a continuation of application Ser. No. 395,401 filed Sept. 10, 1973 now abandoned.

BACKGROUND OF THE INVENTION

1. Field of the Invention

The instant invention relates generally to a lubrication system for an idler roll set, and more particularly to unique means for interconnecting flexible lubrication tubes between end caps secured on the hollow support shafts for adjacent idler rolls.

2. Prior Art

Numerous attempts have been made to achieve a one-shot lubrication system which will effectively lubricate the whole series of a set of idler rolls when a pressurized grease gun has been applied to a fitting at one end of the series and a suitable pressure relief valve or fitting has been applied to the opposite end. In addition to having the ability to effectively distribute the lubricant, the system must be flexible in nature to permit the axial angularity of the adjacent rolls to be altered without impairing the effectiveness of the system by destroying the communication between adjacent rolls.

One approach for realizing these objectives was set forth in U.S. Pat. No. 3,070,219, granted Dec. 25, 1962, to Vincent J. Donadio. Such patent proposed ball and socket joints of hollow construction defined between adjacent idler rolls to communicate with hollow axial shafts defined within the rolls, thus forming a lubricant passageway extending along the full length of the series of rolls. Radial ports in the lubricant passageway permit limited quantities of the grease to flow outwardly and lubricate the bearings situated at the opposite ends of the shaft for each roll.

Another approach for realizing these objectives was set forth in U.S. Pat. No. 3,334,727, granted Aug. 8, 1967 to John D. Rieser. Such patent proposed a unitary rigid tubular shaft that supports an entire set of rolls, such shaft having a substantially horizontal central portion and at least two angularly bent end portions that define a concave surface for the conveyor belt passing therealong. A spaced series of anti-friction bearings are mounted on the shaft, and spaced brackets maintain the angular relationship between adjacent rolls. Plugs are situated in the shaft at spaced intervals to divert the flow of lubricant issuing from radial ports in the shaft into, and through, the anti-friction bearings, and thence back into the tubular shaft.

Yet another approach was set forth in U.S. Pat. No. 3,259,227, granted July 5, 1966 to Walter C. Steinmetz, and in U.S. Pat. No. 3,489,471, granted Jan. 13, 1970 to Hugh D. Kelley. These patents proposed a cylindrical tube that is retained at its opposite ends in apertures in end caps secured to the opposing ends of axial shafts of adjacent rolls. The cylindrical tube is slipped into position within the apertures in the end caps and extends axially into the hollow bores extending through the rolls. The tube is slidable within the axial bores as the rolls are angularly adjusted relative to one another, thus avoiding harmful stresses upon the tube. Radial ports communicating with axial bores in the shafts supporting the rolls permit the lubricant to flow into, and through, spaced bearings situated at the ends of each roll.

All of these approaches suffered from one or more defects. For example, the ball and socket joint of Donadio was expensive to machine and difficult to maintain in proper alignment and/or sealing relationship, whereas the single shaft of Rieser lacked the flexibility necessary to permit repeated adjustment of the angular relationship between adjacent rolls. The lubrication tubes proposed by Steinmetz and Kelley were not firmly secured in passageways in the end cap, and thus could work free from the passageway in the end caps under the severe operating conditions normally associated with troughing conveyors and the pressure of the lubricant being forced through the tubes.

SUMMARY

Thus, with the deficiencies of the prior art techniques enumerated above clearly in mind, the instant invention contemplates a lubrication tube system that is simple in design, inexpensive to fabricate and install and most significantly, is positively locked in fixed position within passageways in adjacent end caps. The positive locking action is obtained by sundry cooperating means defined between the wall of the passageway in the end cap and the exterior surface of the tube. The tube is flexible in nature, and allows repeated angular adjustments between adjacent rolls without impairing the effectiveness of the lubrication system.

Other significant advantages of the instant lubrication tube system will become obvious to the skilled artisan, when the following detailed description of the invention is construed in harmony with the appended drawings.

BRIEF DESCRIPTION OF THE DRAWINGS

FIG. 1 is a perspective view of an idler roll set of a troughing conveyor;

FIG. 2 is a fragmentary front elevational view of a pair of adjacent rolls showing a preferred embodiment of the lubrication tube constructed in accordance with the principles of the instant invention extending therebetween;

FIG. 3 is a front elevational view of an end cap with a lubrication tube positioned therein, such view being taken along line 3—3 in FIG. 2 and in the direction indicated;

FIG. 4 is a cross-sectional view through the rolls, end caps, and lubrication tube of FIG. 2, such view being taken along line 4—4 in FIG. 2 and in the direction indicated;

FIG. 5 is a perspective view of the preferred embodiment of the lubrication tube of FIG. 2;

FIG. 6 is a fragmentary cross-sectional view of a pair of adjacent rollers showing a first alternative embodiment of the lubrication tube;

FIG. 7 is a perspective view of the lubrication tube of FIG. 6;

FIG. 8 is a perspective view of a second alternative embodiment of the lubrication tube;

FIG. 9 is a perspective view of a third alternative embodiment of the lubrication tube;

FIG. 10 is a fragmentary cross-sectional view of the lubrication tube of FIG. 9 secured in postion in an aperture in an end cap; and FIG. 11 is a fragmentary cross-sectional view of a pair of adjacent rolls showing a fourth alternative embodiment of the lubricaton tube.

DESCRIPTION OF THE INVENTION

Referring now to the drawings, FIGS. 1 and 2 depict an idler roll set within which the lubrication tube system of the instant invention finds particular applicability. The upper run of a conveyor belt 10 is entrained over the idler roll set to define a troughing conveyor. The idler roll set comprises a right end bracket 12, a first interior bracket 14, a second interior bracket 16, and a left hand end bracket 18. A channel 20 extends between the end brackets and supports the interior brackets 14 and 16. Bolts 22 passing through the longitudinal braces 24 are employed to secure the idler roll set in fixed position.

A wing roll 26 is secured in a canted position between right end bracket 12 and first interior bracket 14, and another wing roll 20 is similarly secured in a canted position between left end bracket 18 and second interior bracket 16. A horizontally disposed roll 30 is secured between interior brackets 14 and 16. Belt 10, when loaded with material to be transported, flexes downwardly to define a concave trough that approximates the contour of rolls 26, 28 and 30.

FIGS. 2 and 3 show the manner in which the rolls, such as 26 and 30, are seated within the interior brackets 14 and 16. Since brackets 14 and 16 are mirror-images of one another, only bracket 14 will be discussed in detail. Bracket 14 includes a first vertical support 14a and a second vertical support 14b joined together by an integrally formed, horizontal loop 14c. Polygonal apertures 14d, which open upwardly through loop 14c, are defined near the upper ends of supports 14a and 14b. Metal end caps 32 having a plurality of wrench flats 34 are secured to the opposite ends of each roll, and the number and shape of the wrench flats is chosen to conform to the outline of the apertures 14d. A lip 36 that is greater in radial dimension than flats 34 is located at the axial end of each end cap. A U-shaped wedging element 38, comprising a body member 40 whose legs 42, 44 contact flats 34 on adjacent caps 32, is employed to keep the end caps and the rolls connected thereto in fixed position after the end caps 32 have been seated within the apertures 14d in the first and second supports 14a, 14b. Opposite ends of lubrication tube 48 are retained within the axially extending passageways 50 of adjacent end caps 32 by novel securing techniques detailed hereinafter.

FIGS. 4 and 5 illustrate that tube 48 comprises a length of resilient material, such as plastic or rubber, that possesses the ability to return to its original shape after stress is removed therefrom. Passageway 50 extends axially clear through end cap 32 to establish communication with the hollow axial passage 52 in the metallic shaft 54 that extends though, and supports, an idler roll thereupon. The inner diameter of passageway 50 is such as to provide a clearance fit throughout most of its axial length with respect to the external diameter of tube 48. Passageway 50 terminates in an inwardly extending knife edge 50a. When tube 48 is slipped inwardly into passageway 50, the initial insertion phase is virtually unimpeded. However, when the end of tube 48 reaches knife edge 50a, the insertion force required increases as tube 48 contracts in order to pass therethrough. Thereafter tube 48 reexpands behind knife edge 50a. Resilient tube 48 does not collapse but continues to exert a radially directed force against edge 50a, thus providing a locking effect. Once secured, tube 48 can be withdrawn, when necessary for replacement, but the interaction between the sharp edge of knife edge 50a and the portion of tube 48 coacting therewith requires the application of a force whose magnitude far exceeds the force required for insertion into, and through, passageway 50 in end cap 32.

A first alternative embodiment of the lubrication tube is illustrated in FIGS. 6 and 7. Thus, tube 52 is notched at its opposite ends, as indicated by reference numeral 54. The notches facilitate the "necking down" of tube 52 as the tube is inserted through passageway 50 to be secured in fixed position by knife edge 50a. In the second alternative embodiment of FIG. 8, tube 56 has slits 58 at opposite ends thereof in lieu of notches 54; the slits serve the same function as the notches.

FIGS. 9 and 10 depict another alternative embodiment of the lubrication tube, such tube being identified by reference numeral 60 and being characterized by a pre-formed necked down portion 62 and an annular lip 64 at each end of the tube. When tube 60 has been completely inserted into passageway 50 in end cap 32, knife edge 50a follows the contour of the tube and presses radially inwardly between portion 62 and lip 64, as shown in FIG. 10.

FIG. 11 depicts yet another alternative embodiment of the lubrication tube and a modified end cap 32a. End cap 32a has an annular, axially extending groove 66 defined in its outer face, and a hollow boss 68 located within the outline of the groove. Passageway 50 extends axially inwardly through boss 68 to establish communication with axial passage 52 in shaft 54. Although not shown in the preceding drawings, radial ports 70 are formed at spaced intervals along shaft 54 to allow the lubricant to flow into, and through, anti-friction bearings 72. Dust seals 74 prevent dust and dirt from entering the bearings and contaminating the lubricant.

The opposite ends of cylindrical lubrication tube 76 are slipped into position within grooves 66 and the tube is retained in fixed position by the engagement of the tube ends with outwardly tapering boss 68. The outer diameter of the boss is chosen to be slightly larger than the inner diameter of the tube 76, so that the inherent resiliency of the tube locks it securely in place on the boss. In all of the embodiments illustrated and described, the lubrication tube is flexible so that the angular relationship between wing rolls 26, 28 and center roll 30 can be repeatedly altered to change the depth of the concave trough in belt 10 without adversely affecting the locking engagement, or the operational efficiency, of the lubrication tube.

Various modifications in the size, shape and materials utilized in the instant, one-shot lubrication system will become apparent to the skilled artisan. For example, the diameter of passageway 50 may gradually diminish from the enlarged entrance to knife edge 50a, and the entrance may be shaped to guide the tube into the passageway. Consequently, the appended claims should be liberally construed in a manner consistent with the contribution to the useful arts and sciences represented by the instant invention.

I claim:

1. A lubrication conduit for a pair of idler rolls rotatively mounted one proximate the other; comprising:
   (a) a first lubrication passageway provided in one end of a first one of the idler rolls;
   (b) a second lubrication passageway provided in one end of a second one of the idler rolls;
   (c) said first lubrication passageway and said second lubrication passageway being disposed proximate one another when the idler rolls are relatively mounted one proximate the other;

(d) said first and said second lubrication passageways each having formed therein, at their respective innermost ends, a restricting means in the form of a knife-edge;

(e) each said first and second lubrication passageways being formed with a predetermined diameter for a major length thereof and with a diameter at said knife-edge which is smaller than said predetermined diameter;

(f) a resilient lubrication tube having an external diameter which proximates said predetermined diameter and is larger than the diameter of said knife-edge and having one of its ends disposed in said first lubrication passageway so as to cooperate with said restricting means formed therein, and its other end disposed in said second lubrication passageway so as to cooperate with said restricting means formed therein;

(g) said lubrication tube having notches removed from its opposite ends so that said lubrication tube can be flexed inwardly more readily when engaged by said knife-edge;

(h) said cooperation between said respective restricting means and said lubrication tube ends being such that said knife-edge radially deforms said lubrication tube and the resiliency of said lubrication tube resists such deformations to thus constrict said lubrication tube at locations removed from but proximate the ends thereof while permitting said lubrication tube to assume a non-constricted configuration to either side of said respective constrictions.

2. A lubrication conduit for a pair of idler rolls rotatively mounted one proximate the other; comprising:

(a) a first lubrication passageway provided in one end of a first one of the idler rolls;

(b) a second lubrication passageway provided in one end of a second one of the idler rolls;

(c) said first lubrication passageway and said second lubrication passageway being disposed proximate one another when the idler rolls are rotatively mounted one proximate the other;

(d) said first and said second lubrication passageways each having formed therein, at their respective innermost ends, a restricting means in the form of a knife-edge;

(e) each said first and second lubrication passageways being formed with a predetermined diameter for a major length thereof and with a diameter at said knife-edge which is smaller than said predetermined diameter;

(f) a resilient lubrication tube having an external diameter which proximates said predetermined diameter and is larger than the diameter of said knife-edge and having one of its ends disposed in said first lubrication passageway so as to cooperate with said restricting means formed therein, and its other end disposed in said second lubrication passageway so as to cooperate with said restricting means formed therein;

(g) said lubrication tube having axial slots formed therein at its opposite ends so that said lubrication tube can be flexed inwardly more readily when engaged by said knife-edge;

(h) said cooperation between said respective restricting means and said lubrication tube ends being such that said knife-edge radially deforms said lubrication tube and the resiliency of said lubrication tube resists such deformations to thus constrict said lubrication tube at locations removed from but proximate the ends thereof while permitting said lubrication tube to assume a non-constricted configuration to either side of said respective constrictions.

3. A lubrication conduit for a pair of idler rolls rotatively mounted one proximate the other; comprising:

(a) a first lubrication passageway provided in one end of a first one of the idler rolls;

(b) a second lubrication passageway provided in one end of a second one of the idler rolls;

(c) said first lubrication passageway and said second lubrication passageway being disposed proximate one another when the idler rolls are rotatively mounted one proximate the other;

(d) said first and said second lubrication passageways each having formed therein, at their respective innermost ends, a restricting means in the form of a knife-edge;

(e) each said first and second lubrication passageways being formed with a predetermined diameter for a major length thereof and with a diameter at said knife-edge which is smaller than said predetermined diameter;

(f) a resilient lubrication tube having an external diameter which proximates said predetermined diameter and is larger than the diameter of said knife-edge and having one of its ends disposed in said first lubrication passageway so as to cooperate with said restricting means formed therein, and its other end disposed in said second lubrication passageway so as to cooperate with said restricting means formed therein;

(g) said lubrication tube having an annular lip and a neck of reduced diameter at its opposite ends, said knife-edge engaging, and deforming, said lubrication tube between said lip and said neck;

(h) said cooperation between said respective restricting means and said lubrication tube ends being such that said knife-edge radially deforms said lubrication tube and the resiliency of said lubrication tube resists such deformations to thus constrict said lubrication tube at locations removed from but proximate the ends thereof while permitting said lubrication tube to assume a non-constricted configuration to either side of said respective constrictions.

* * * * *